United States Patent [19]

Howell et al.

[11] 3,827,741

[45] Aug. 6, 1974

[54] RESILIENT BUMPER ASSEMBLY

[75] Inventors: Carl A. Howell, Livonia; George H. Muller, Ann Arbor, both of Mich.

[73] Assignee: Ford Motor Company, Dearborn, Mich.

[22] Filed: Aug. 6, 1973

[21] Appl. No.: 385,510

[52] U.S. Cl.................. 293/99, 293/71 P, 152/379
[51] Int. Cl............................................... B60r 9/08
[58] Field of Search............. 293/1, 71 R, 71 P, 88, 293/99; 267/140, 141; 152/375, 378, 379, 397, 398; 285/96, 97, 297, 294

[56] References Cited
UNITED STATES PATENTS
2,089,500   8/1937   Ochadloski........................ 293/71 P
3,606,434   9/1971   Barton et al. ....................... 293/71 R FOREIGN PATENTS OR APPLICATIONS
912,303   5/1954   Germany........................... 293/71 R Primary Examiner—Robert S. Ward, Jr.
Assistant Examiner—Robert Saifer
Attorney, Agent, or Firm—Keith L. Zerschling; Roger E. Erickson

[57] ABSTRACT

A resiliently deformable bumper assembly which includes an elastomeric outer shell attached to a rigid backing member. The shell is attached to upper and lower grooves formed in the backing member by means of beads received within the grooves. Each of the beads is formed by a rearward edge portion of the outer shell together with a strip of injected caulking material partially enclosed by the edge portion. The beads are preferably bulbous in cross sectional shape and conform generally to the interior contours of the respective grooves.

9 Claims, 2 Drawing Figures

PATENTED AUG 6 1974    3,827,741

3,827,741

RESILIENT BUMPER ASSEMBLY

BACKGROUND AND SUMMARY OF THE INVENTION

A resiliently deformable automobile bumper of the type in which a substantially hollow resilient outer shell secured to a rigid bumper backing member is receiving increasing consideration for usage as a means to reduce automotive vehicle body damage resulting from low speed impacts or collisions. An example of such a bumper assembly is illustrated in U.S. Pat. Application Ser. No. 201,828, filed Nov. 24, 1971 and entitled "Pneumatic Flexible Bumper." This invention provides means to attach a resiliently deformable outer shell as described therein to a rigid backing member. This invention also provides an effective means of attachment which reduces the number of machining operations and mechanical fasteners over the prior art and which is low cost and reliable. The invention also provides attachment means capable of being efficiently mass produced and serviced.

A resiliently deformable bumper assembly constructed in accordance with this invention includes an elastomeric outer shell and a rigid backing member. The bumper shell has an edge portion which is received within a longitudinal groove formed in the backing member. A caulking material is injected into the groove and together with the edge portion of the outer shell forms a bulbous bead conforming in cross section to that of the groove.

DETAILED DESCRIPTION OF A PREFERRED EMBODIMENT

Figure 1:
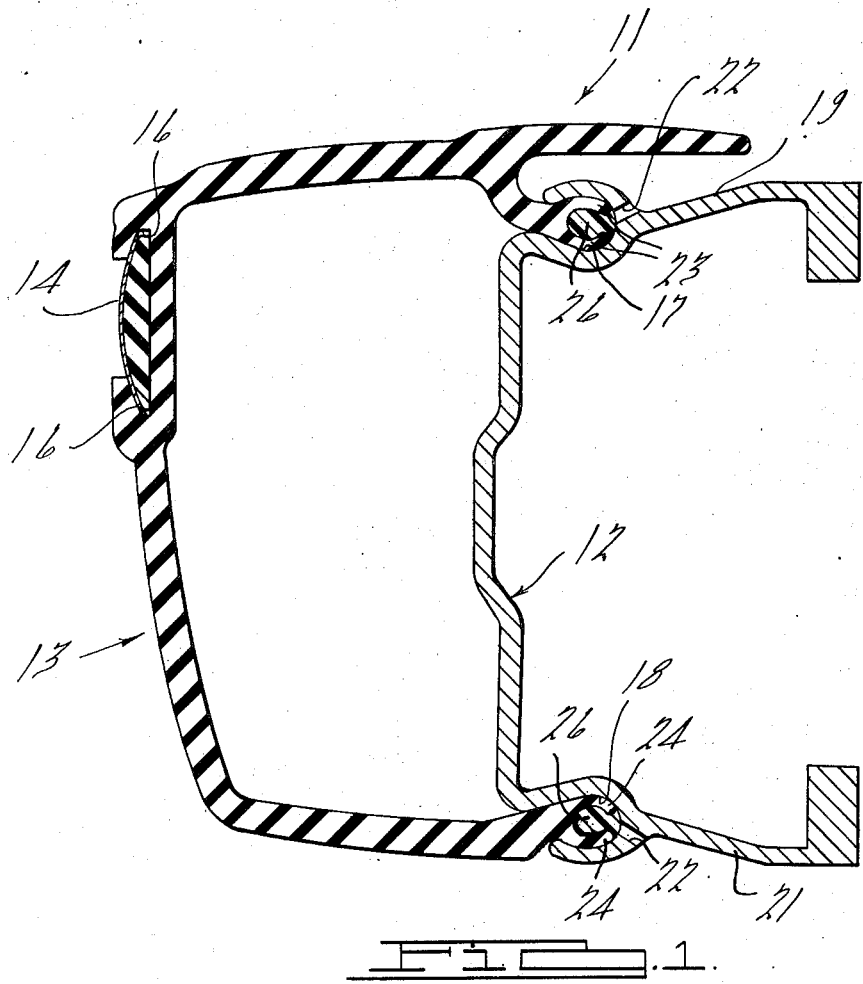
FIG. 1 is a cross sectional view of a bumper assembly constructed in accordance with this invention.

FIG. 1 is a transverse cross section of a generally elongate bumper assembly suitable for use as an automotive vehicle bumper. The bumper assembly 11 includes an elongate backing member 12 having a generally C-shaped cross section to which is mounted an elastomeric, resiliently deformable shell 13. A shiny surface trimstrip 14 is received within a longitudinally extending track 16 molded into the front face of the outer shell.

The backing member has a generally C-shaped cross section and includes a pair of frontwardly opening upper and lower grooves 17 and 18 cooperatively formed with the top 19 and bottom 21, respectively, of the backing member. The grooves 17 and 18 have bulbous cross sectional shapes such that the openings thereto are restricted relative to the maximum dimensions of the groove interiors. A plurality of longitudinally spaced drilled openings 22 are formed in the base of the longitudinal grooves opening to the exterior of the backing member 12.

Figure 2:
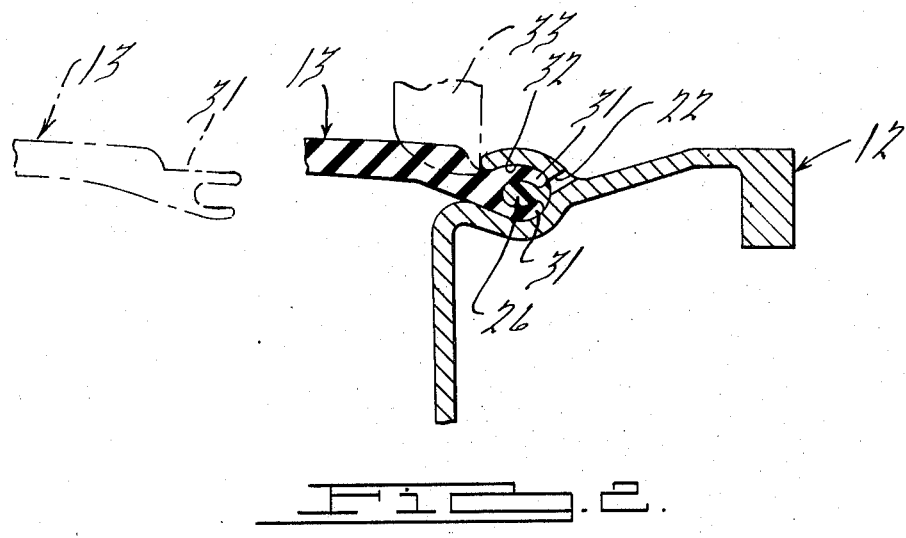
FIG. 2 is a portion of an alternate embodiment of a bumper assembly incorporating the invention, showing a method of assembly of the outer shell to the backing member.

The upper and lower rearward edges 23 and 24, respectively, of the bumper shell 12 are forked having a free-state shape similar to that shown by the dotted-line representation in FIG. 2. The forked edge portions 23 and 24 are fully received within the grooves 17 and 18, respectively, and receive caulking material 26 between their respective forked elements introduced at the base of the groove through holes 22. The injection of caulking material spreads the forked elements to the maximum extent permitted by the contour of the inner surface of the groove. The caulking adheres to the portions 23 and 24 and with the passage of time becomes less deformable and acquires a set. Thus, the forked edge portions 23 and 24 and the caulking material together form bulbous elongate beads corresponding in shape and size to the interior of the longitudinal grooves 17 and 18, respectively. After the caulking has had an opportunity to set, the joint formed by the groove and the forked edge with caulking material adhering thereto is highly resistant to separation. The joint has its greatest resistance to separation when the separation forces are directed perpendicularly to the general longitudinal extent of the bead. A lesser resistance to separation exists when the forces of separation are directed more nearly parallel to the general longitudinal extent of the groove. This latter mentioned separation, referred to as "unzipping," can be prevented by providing a bolt or other mechanical fastener to the end of the bead or to another adjacent end portion of the shell.

The forked elements of each of the shell edges 23 and 24 are sufficiently long so that in cooperation with the contour of the respective inner surfaces of the longitudinal grooves 17 and 18, they partially encircle or grasp a bulbous cross sectioned strip of caulking material. To withdraw a bead from its groove the caulking material 26 must be extruded from the grasp of the forked elements of portions 23 or 24.

FIG. 2 of the drawings illustrates a construction of the edge portion 31 of the bumper shell which facilitates automated insertion into the groove 32. As the edge portion moves toward the groove, it is guided by a tool 33 into position for final insertion into the groove.

It should be understood that other embodiments or modifications of the invention may be proposed by those skilled in the art which are included within the scope of the claims which follow. One such embodiment or modification is to substitute a single strip edge for the forked edge 23 of the resilient outer shell 13. The caulking is then injected against an upper or lower surface of the single strip edge so as to force the strip against a lower or upper, respectively, contoured inner wall of the backing member groove 17. This modification would simplify the assembly of the outer shell to the backing member.

We claim:

1. A resiliently deformable bumper including an elastomeric outer shell and a rigid backing member,
   an elongate groove formed in said backing member having an elongate opening of lesser width than interior dimensions of said groove,
   said outer shell including an edge portion received within said groove,
   caulking-type material received within said groove to form a bead in combination with said edge portion within said groove.

2. A resiliently deformable bumper according to claim 1,
   passage means formed in said backing member through which said caulking-type material can be injected into said groove.

3. A resiliently deformable bumper including an elastomeric outer shell and a rigid backing member,
an elongate groove formed in said backing member having a generally bulbous cross sectional shape,
said outer shell including an edge portion received within said groove,
caulking-type material received within said groove to form in combination with said edge portion a bulbous bead within said groove.

4. A resiliently deformable bumper according to claim 3,
passage means formed in said backing member through which said caulking-type material can be injected into said groove.

5. A resiliently deformable bumper including an elastomeric outer shell and a rigid backing member,
an elongate groove formed in said backing member having a generally bulbous cross sectional shape,
said outer shell including an edge portion received within said groove,
said edge portion being forked and including a pair of divergent elements,
caulking-type material received within said groove and between the elements of said forked edge portion to form in combination with said edge portion a bulbous bead within said groove.

6. A resiliently deformable bumper according to claim 5,
passage means formed in said backing member at the base of said groove through which said caulking-type material can be injected into said groove.

7. A resiliently deformable bumper according to claim 5,
said caulking material forcing said elements to spread against the interior walls of said groove.

8. A resiliently deformable bumper according to claim 5,
said elements being of sufficient length to partially enclose and grasp a portion of said caulking material within said groove.

9. An improvement in a resiliently deformable bumper for an automotive vehicle inclusing an elastomeric outer shell and a rigid backing member,
an elongate groove formed in said backing member having an elongate opening of lesser than a corresponding interior dimension of said groove,
said improvement comprising an edge portion on said outer shell received within said groove,
caulking-type material received within said groove to form an elongate bead in combination with said edge portion within said groove.

* * * * *